Sept. 3, 1968 R. H. WISE 3,399,419
WINDSHIELD WIPER
Filed July 13, 1966 5 Sheets-Sheet 2
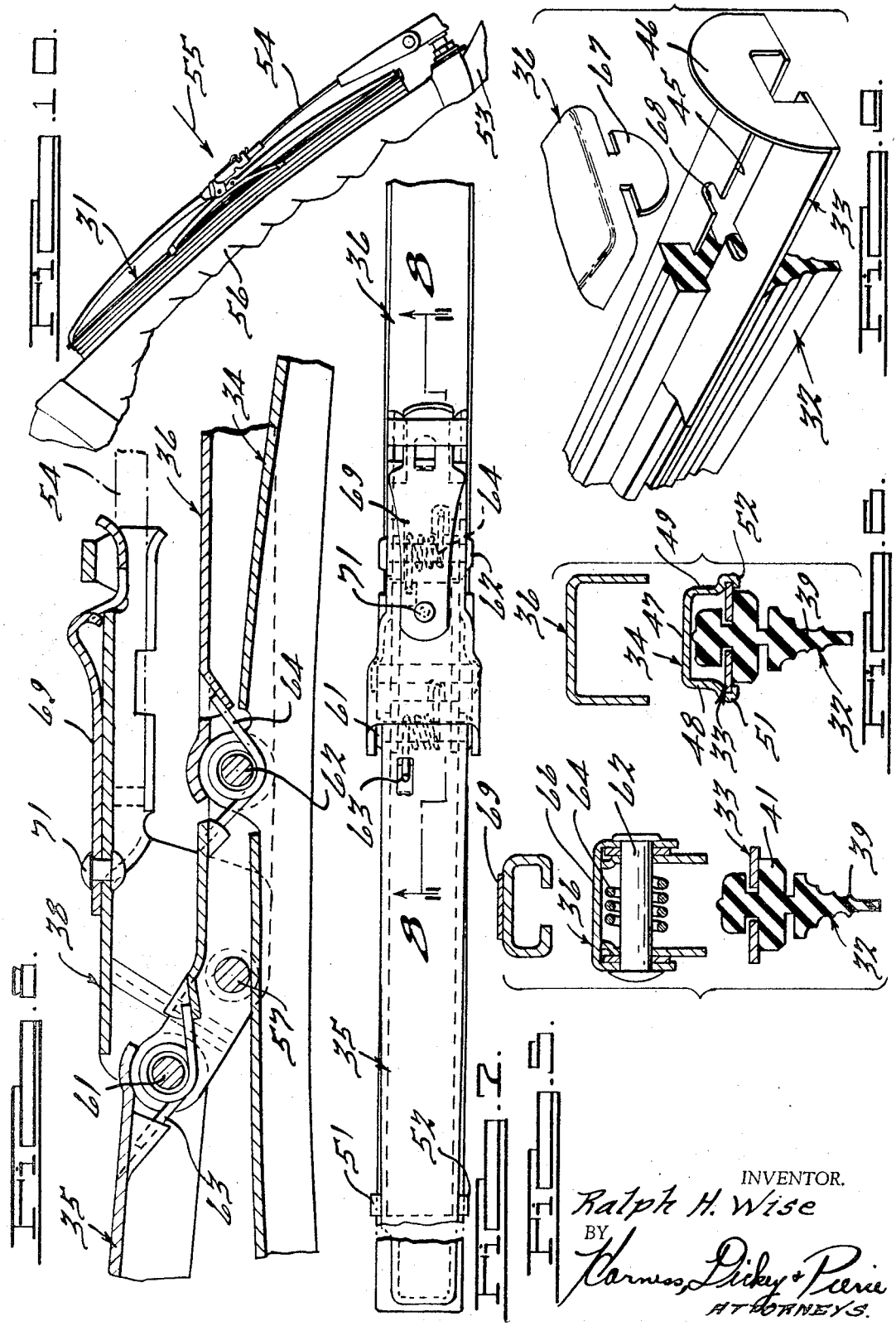
INVENTOR.
Ralph H. Wise
BY
Harness, Dickey & Pierce
ATTORNEYS.

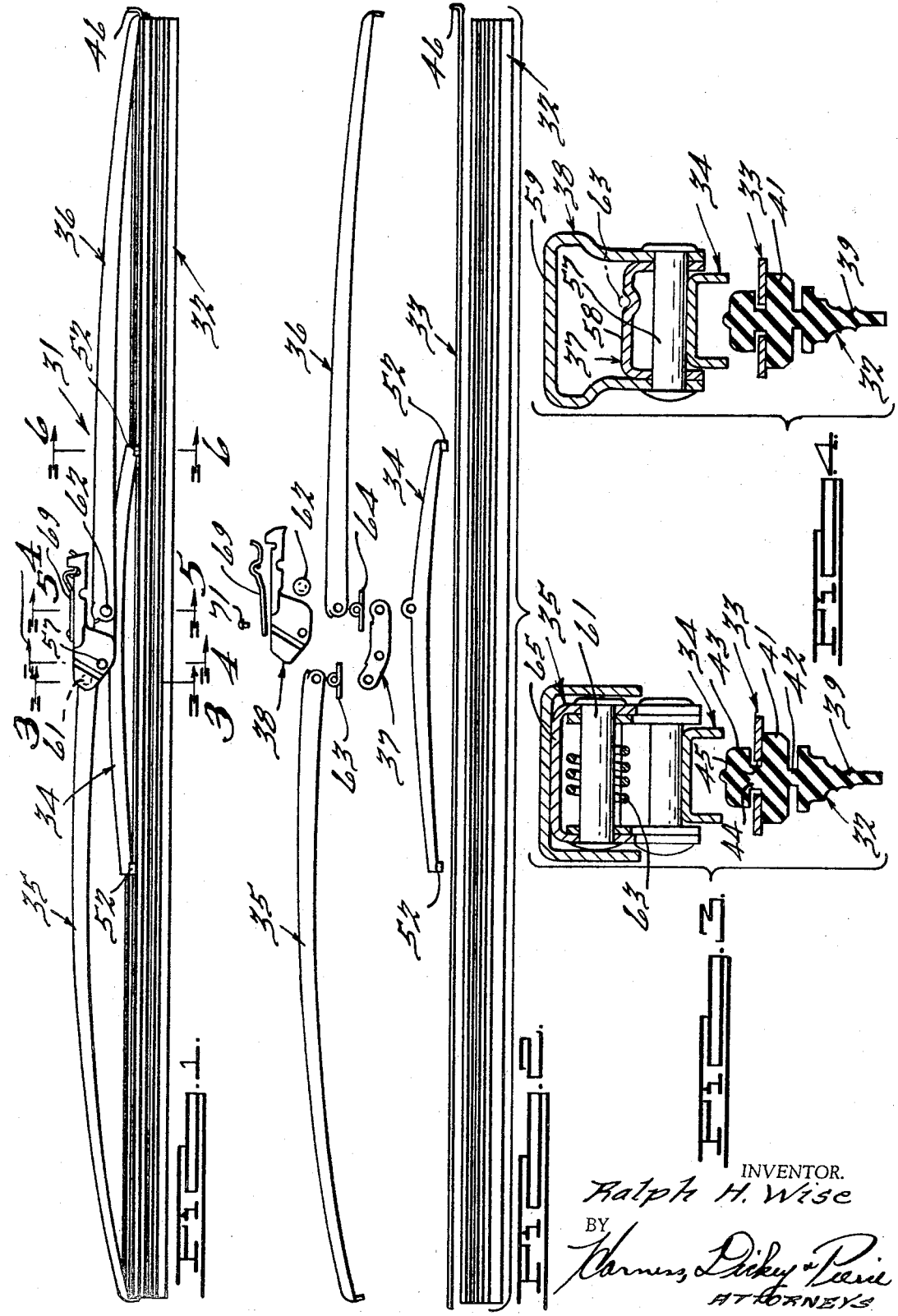

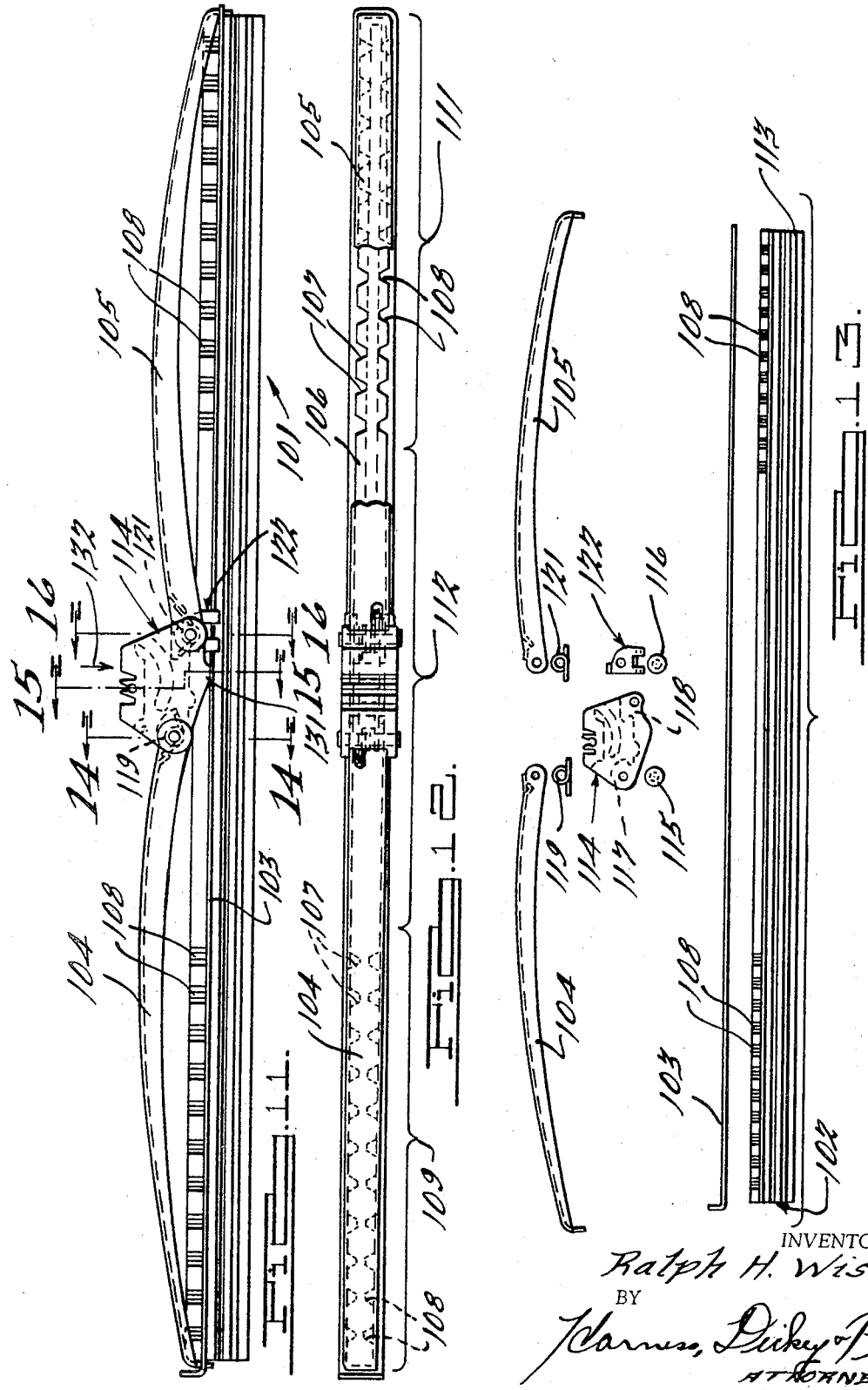

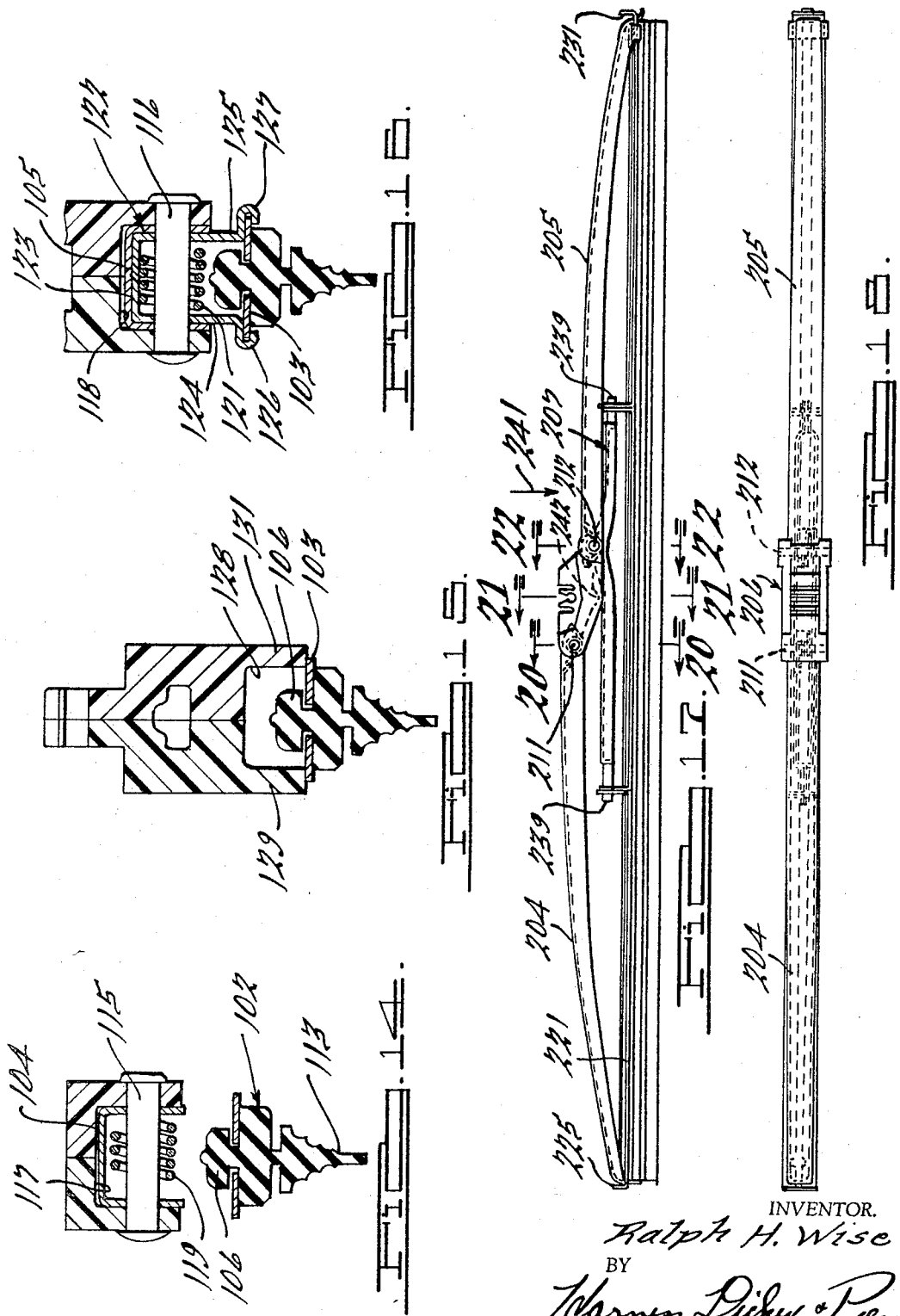

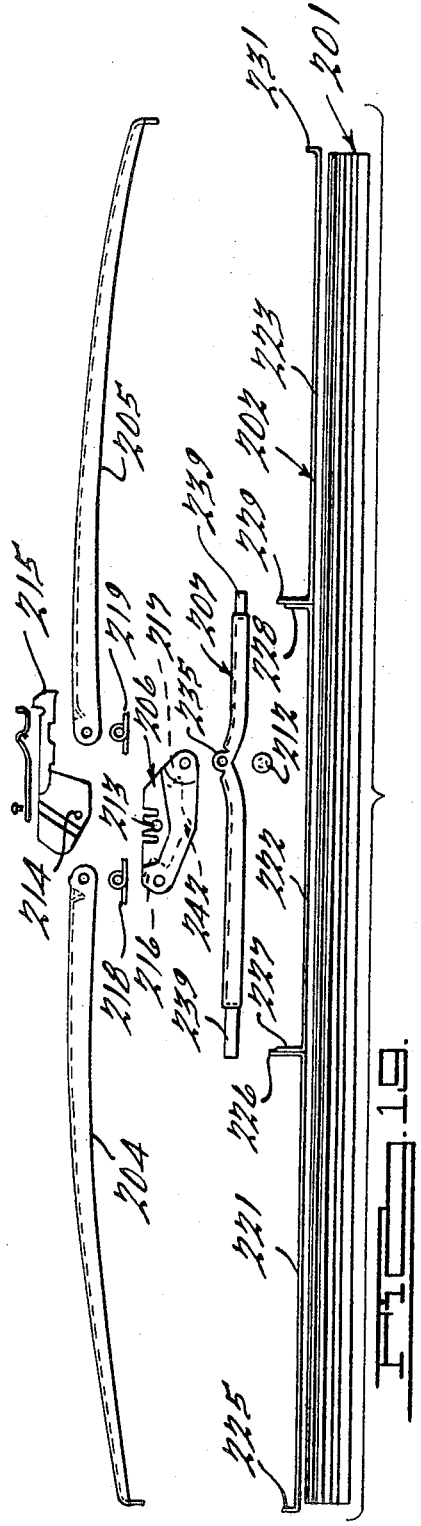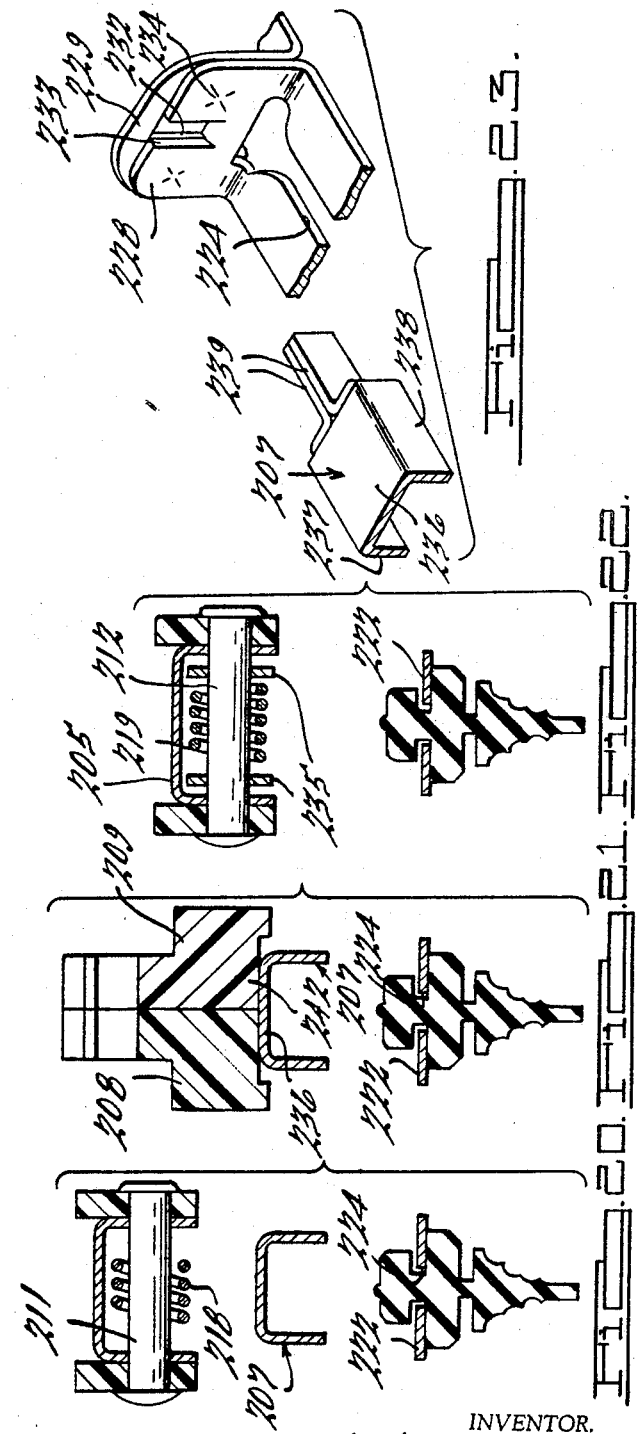

United States Patent Office 3,399,419
Patented Sept. 3, 1968

3,399,419
WINDSHIELD WIPER
Ralph H. Wise, 20301 Oakwood,
Dearborn, Mich. 48124
Filed July 13, 1966, Ser. No. 564,773
20 Claims. (Cl. 15—250.42)

ABSTRACT OF THE DISCLOSURE

A windshield wiper having a pair of bow levers pivoted at spaced points to a connecting link, the latter having a pivotal connection to a central carrier load member and a connection to the oscillating arm spaced from said load member connection.

---

This invention relates to windshield wipers, and more particularly to wipers adapted for use with curved windshields of modern day automobiles.

Automotive windshield wipers are at times subjected to what is known as a "skip-wipe" condition, in which the wiper blade alternately slips and grabs on the glass surface of the windshield, creating vision problems for the driver at a time when careful driving is vital.

It is an object of the invention to provide a novel and improved windshield wiper construction which, by a proper distribution of the glass-engaging forces exerted on the blade, will minimize these vision problems, and assure continuous wiping action in the area most essential for good visibility, that is, the central area of the windshield through which the driver is looking most of the time.

It is another object to provide an improved windshield wiper of this nature which, while insuring this central area wiping action, will transmit glass-engaging forces to the end portions of the wiper blade, this being done in a controlled manner which can be readjusted to accommodate various sizes and curvatures of windshields.

It is also an object to provide a novel and improved windshield wiper of this character which includes a wiper blade carrier of unique construction, this carrier coacting with other elements of the assembly to insure that pressure is applied to the central portion area of the blade, and by means of which the forces applied to the wiper blade may be varied along its length due to the inherent construction of the carrier itself.

It is another object to provide an improved windshield wiper having the above characteristics, in which a novel construction of the wiper blade is incorporated, serving to minimize the possibility of irregularities being created in the blade edge when it bows while passing over sharply curved portions of the windshield.

It is a further object to provide an improved windshield wiper of this nature which may incorporate a connector adapted to be coupled to the oscillating arm in a variety of ways, this connector coacting with the other portions of the assembly to accomplish the objects set forth above.

The manner of accomplishing the foregoing objects and other objects and features of this invention will become apparent from the following description of embodiments of the invention when read with reference to the accompanying drawings, in which:

FIGURE 1 is a side elevational view of one embodiment of the invention utilizing a one-piece wiper blade carrier and a load bar for applying pressure to the central portion thereof;

FIGURE 2 is an exploded view of the assembly of FIGURE 1, showing various components thereof;

FIGURE 3 is a cross-sectional view in elevation taken along the line 3—3 of FIGURE 1, and showing the spring pivot connection between the upper bow lever and the connector;

FIGURE 4 is a cross-sectional view taken along the line 4—4 of FIGURE 1, and showing the pivot pin between the coupler and the connector, which also serves to transmit glass-engaging forces to the load bar;

FIGURE 5 is a cross-sectional view taken along the line 5—5 of FIGURE 1, and showing the spring pivot between the connector and lower bow lever;

FIGURE 6 is a cross-sectional view taken along the line 6—6 of FIGURE 1 and showing the connection between one end of the load bar and the wiper blade carrier;

FIGURE 7 is a top plan view of the assembly of FIGURE 1, parts being broken away;

FIGURE 8 is an enlarged fragmentary cross-sectional view in elevation taken along the line 8—8 of FIGURE 7 and showing the coupler and latch subassembly;

FIGURE 9 is a fragmentary perspective view, parts being sectioned, of one end of the wiper assembly, some parts being in exploded position, and showing the manner in which the outer ends of the bow levers retain the wiper blade on the carrier;

FIGURE 10 is a schematic elevational view of a portion of an automotive windshield showing the manner in which the invention operates to insure proper wiping of the central portion of the windshield at all times;

FIGURE 11 is a side elevational view of another embodiment of the invention which differs from the first embodiment in that it shows a three-way connector for connecting the blade assembly in different ways to the oscillating arm, and shows a clip in place of the load bar, this version of the invention being usable on shorter blade assemblies;

FIGURE 12 is a top plan view of the embodiment shown in FIGURE 11, parts being broken away to show the notched head on the wiper blade for permitting it to flex without disturbing its edge shape;

FIGURE 13 is a view similar to FIGURE 11 but with the parts in exploded position;

FIGURE 14 is a cross-sectional view in elevation taken along the line 14—14 of FIGURE 11 and showing the spring pivot between the upper bow lever and the connector;

FIGURE 15 is a cross-sectional view in elevation taken along the line 15—15 of FIGURE 11 and showing the engagement of projections on the connector with the wiper blade carrier;

FIGURE 16 is a cross-sectional view in elevation taken along the line 16—16 of FIGURE 11 and showing the engagement of the clip with the wiper blade carrier;

FIGURE 17 is a side elevational view of a third embodiment of the invention which differs from the first embodiment mainly in that the wiper blade carrier is of sectioned construction, being made up of three contiguous pieces;

FIGURE 18 is a top plan view of the blade assembly shown in FIGURE 17;

FIGURE 19 is an exploded side elevational view of the blade assembly in FIGURE 17;

FIGURE 20 is a cross-sectional view in elevation taken along the line 20—20 of FIGURE 17 and showing the spring pivot between the connector and upper bow lever;

FIGURE 21 is a cross-sectional view in elevation taken along the line 21—21 of FIGURE 17 and showing the engagement of the connector with the load bar;

FIGURE 22 is a cross-sectional in elevation taken along the line 22—22 of FIGURE 17 and showing the spring pivot between the lower bow lever and the load bar as well as the manner in which force is transmitted from the connector to the load bar through this pivot; and FIGURE 23 is a fragmentary exploded perspective view showing the manner in which one end of the load bar is connected to the juncture of two sections of the wiper blade carrier.

In general terms, each of the illustrated embodiments of the invention comprises a wiper blade made of rubber, a flexible elongated carrier for the wiper blade, a superstructure connected to an oscillating arm, and three elements connecting this superstructure to the wiper blade carrier, so as to transmit both the glass-engaging forces and the wiping forces which the oscillating arm exerts against the windshield.

These three connecting elements comprise an upper bow lever, a lower bow lever, and a load member located between the bow levers. The bow levers engage the opposite ends of the wiper blade carrier, while the load member engages the central portion of the carrier. In the case of relatively long wiper blade assemblies, the load member is in the form of a load bar which extends beneath and overlaps the inner portions of both bow levers. In the case of shorter assemblies, the load member comprises a clip engaging a central portion of the carrier. In either case, the member serves to transmit glass-engaging forces exerted by the oscillating arm directly to the central portion of the wiper blade carrier. The bow levers, on the other hand, exert the engaging forces on the ends of the wiper blade carrier only through the intermediary of springs, the strength of which may be preselected to obtain the desired distribution of forces. The bow levers are connected by spring pivots to opposite ends of a connector disposed therebetween. The connector may take any of various forms for accommodating different types of connections to the oscillating arm. In the embodiment using the clip as the load member, the connector also has a projection directly engaging the carrier and thus also serving to transmit glass-engaging forces thereto.

In this manner, it will be seen that sufficient engaging pressure on the central portion of the wiper blade will always be assured, regardless of "skip-wipe" conditions, so that driver visibility in the central area of the windshield will not be impaired.

Another feature of the invention, shown in one form thereof, is the provision of a wiper blade carrier made of three sections rather than as a single piece, these sections being united by abutting flanges at their junctures. The ends of the load bar are mounted in apertures in these flanges so that the flanges serve to transmit glass-engaging pressure exerted by the load bar on the wiper blade carrier. The resilient properties of the three carrier sections may be varied, thus permitting variations to the relative forces exerted on different portions of the wiper blade.

Still another feature of the invention, shown in one form thereof, is the provision of a series of notches in those portions of the wiper blade head adjacent the ends thereof, these notches being formed in opposite sides of the head, the central portion of the head remaining solid. By virtue of these notches, changes in dimension of the head in the direction of the wiper blade axis will be facilitated. This in turn will permit the wiper blade to follow relatively sharp curvatures in the windshield surface without the edge of the blade being distorted.

Another feature of the invention, shown in one form thereof, is the provision of a connector which serves not only to engage the central portion of the wiper blade carrier in the manner aforesaid, but is also adapted to be used with any of three different types of couplers, this connecting link performing the other functions described above, such as supporting the bow levers by spring pivots.

Referring more particularly to the drawings, and particularly the embodiment of FIGURES 1 to 10, the windshield wiper assembly is generally indicated at 31 and comprises a wiper blade generally indicated at 32, a carrier for the wiper blade generally indicated at 33, a load member in the form of a load bar generally indicated at 34, upper and lower bow levers generally indicated at 35 and 36, respectively, a connector 37 between the bow levers, and an oscillating arm coupler generally indicated at 38 surmounting the connector.

The spatial relationship of these parts is perhaps best seen in FIGURES 1, 2 and 7, while their cross-sectional shapes are best seen in FIGURES 3 to 6 and 8. Blade 32 is of conventional construction, having a wiping edge portion 39 (FIGURE 3) of tapered shape, a lower mounting portion 41 surmounting the edge portion and connected thereto by means of a narrow neck 42, and a head portion 43 connected to portion 41 by a narrow neck portion 44. Blade 32 is preferably made of rubber and is supported by carrier 33, which is an elongated strip of springlike flexible steel having a central slot 45 within which portion 44 of the blade is disposed.

One end 46 (FIGURE 2) of carrier 33 is bent at right angles to the remainder of the carrier, and slot 45 extends to end 46 so that the wiper blade may be mounted on the carrier by slipping it on from that end (FIGURE 9). The other end of slot 45 is closed.

Load bar 34 is channel-shaped cross section as seen in FIGURES 3 to 6, having a somewhat deeper section at the center which gradually tapers to shallower sections at the ends. The upper surface or web 47 of load bar 34 (FIGURE 6) is flat in a cross-sectional view, and the side walls 48 and 49 extend vertically downwardly therefrom. A pair of tabs 51 and 52 are formed on opposite sides on each end of the load bar, these tabs being U-shaped so as to grip the opposite edges of carrier 33, as seen in FIGURE 6. This gripping is not tight, but permits sliding movement of the load bar ends relative to the carrier while preventing the carrier from becoming separated from the load bar. Moreover, the upper portions of tabs 51 and 52 overlap the upper surfaces of the edges of the carrier so that when the load bar is pressed downwardly, it will exert downward forces on the carrier at these points. Since the load bar is bowed, it will not engage the carrier along its entire extent unless, due to the curvature of the windshield, the carrier assumes the same curvature as the inside of the load bar.

Means are provided for directly transmitting glass-engaging forces exerted by the oscillating arm of the vehicle to load bar 34. FIGURE 10 shows the vehicle 53 as having an oscillating arm 54 for the wiper, this arm being urged by conventional means (not shown) in the direction of the arrow 55 and also arcuately in alternate directions at right angles to the plane of the paper. The force exerted in the direction of arrow 55 may be referred to as the "glass-engaging force" since it urges the wiper blade assembly 31 against the outer surface of the car windshield 56. The other force may be termed the "wiping force," since it is parallel to the windshield surface.

Referring to FIGURES 1 to 9, the means for exerting the glass-engaging force against load bar 34 comprises a pin 57 which extends transversely to and engages the upper surface of load bar 34, as seen in FIGURES 3 and 4. The outer ends of this pin are secured to connector 37 and also to coupler 38, as seen in FIGURES 3 and 4. Connector 37 is in the form of a link and has an upper web portion 58 and downwardly extending flanges through which pin 57 extends. Coupler 38 also has an upper web portion 59 and downwardly extending flanges which overlie the flanges of connector 37.

Therefore, engaging forces in the direction of arrow 55 (FIGURE 10) which act on connector 38 will be transmitted directly through pin 57 to the central portion of load bar 34. Since the load bar is supported at its ends by wiper blade carrier 33, glass-engaging forces will be exerted on the central portion of wiper blade 32 between the ends of the load bar.

This engaging force will also of course act on bow levers 35 and 36 which are connected to connector 37 so as to receive these forces through resilient means. More particularly, bow levers 35 and 36 are of inverted channel-shaped construction as seen in FIGURES 3 and 6, and are pivoted to the opposite ends of connector 37 by means of pins 61 and 62 respectively. Web 58 may be removed at the ends of the connector to provide clearance for the adjacent portions of the bow levers. Coil springs 63 and 64 surround pins 61 and 62 respectively, the inner ends of these springs engaging web 58 of the connector (see FIGURES 4 and 7). The outer ends of springs 63 and 64 engage the upper webs 65 and 66 of bows 35 and 36 respectively. The spring arrangement is such that, as seen in FIGURE 1, bow lever 35 will be urged counterclockwise about pin 61 and while bow lever 36 will be urged clockwise about pivot 62. By varying the strengths of springs 63 and 64, as well as the relative lengths of the bow levers, the engaging forces exerted by the bow levers on the outer ends of the wiper blade assembly may be varied to suit individual requirements.

The engagement of the outer ends of the bow levers with the outer ends of carrier 33 is best seen in FIGURE 9. A dovetail projection 67 is provided at the outer end of each bow lever 35 and 36, and this projection is adapted to slip into an enlarged opening 68 in slot 45 adjacent the end thereof. The bow lever may then slip out to the outer end of the carrier where, in the case of bow lever 36, it will engage upstanding flange 46. In the case of bow lever 35 it will engage the closed end of slot 45 (not shown). Blade 32 will thus be retained against axial sliding movement by dovetail projections 67.

Coupler 38 is provided with a detent spring 69 for retaining the outer end of oscillating arm 54, this spring being secured to coupler 38 by a rivet 71 seen in FIGURES 2 and 7.

In operation of the embodiments shown in FIGURES 1 to 10, oscillation of arms 54 will result in wiping action of blade 32 on windshield 56. As this wiping action progresses in each direction, the curvature of the windshield may change. The resilient wiper blade carrier 33 will follow this curvature, as urged by load bar 34 and bow levers 35 and 36. The bow levers will pivot with respect to connector 37 during this operation and their outer ends will slide within slot 45 of carrier 33.

Moreover, as carrier 33 flexes, it will slide with respect to retaining fingers 51 and 52. At all times, however, the engaging pressure exerted by oscillating arm 54 in the direction of arrow 55 will be transmitted directly to the central portion of the wiper blade carrier through pin 57 and load bar 34.

FIGURES 11 to 16 show another embodiment of the invention which differs from that of FIGURES 1 to 10 in that it incorporates a different type of connector for attaching the blade assembly to the oscillating arm, shows a clip instead of a load bar for the central load member, and also includes notched end portions on the wiper blade head. The clip type of load member is especially adapted for use with wiper blades of shorter length, and a relatively short span of the central carrier portion receives the glass-engaging force directly from the oscillating arm.

In this embodiment, the entire assembly is generally indicated at 101 and comprises a wiper blade generally indicated at 102, a carrier 103 and bow levers 104 and 105. Blade 102 has the same general construction as blade 32 in the previous embodiment, except for the fact that the opposite end portions of head 106 of the blade are provided with a series of spaced notches 107 on one side thereof and another series of spaced notches 108 on the other side. These notches are best seen in FIGURE 12, and are preferably V-shaped, the inner ends of notches 107 being somewhat spaced from the inner ends of notches 108. The notched portions of head 106 extend approximately one-third of the distance from each end of the blade, as indicated by the brackets 109 and 111 in FIGURE 12. The central portion of head 106, indicated at 112 in FIGURE 12, is not notched.

Notches 107 and 108 will permit the end portions of blade 102 to conform to the sharply curved configuration of some windshields without unduly distorting edge portion 113 of the blade. This will be due to the fact that the notches will permit greater flexibility of head 106 as wiper blade 102 bends to conform to the windshield, so that the possibility of corrugations or wave-like distortions occuring in the blade portion 113 will be minimized.

Carrier 103 is constructed similarly to carrier 33 of the previous embodiment, as are bow levers 104 and 105. The connector is generally indicated at 114 and comprises a two-piece unit, suitably manufactured of a plastic material, with the two pieces being united by rivet pins 115 and 116, as seen in FIGURES 14 and 16. The particular construction of this connector will not be described in detail, since it forms the subject of my application Ser. No. 322,981 filed Nov. 12, 1963, now Patent No. 3,178,753, dated Apr. 20, 1965. However, it may be stated generally that connector 114 is adapted to be used with any of three different types of connections to oscillating arms. These connections are generally known as a "spoon end" arm connection, a "pin end" connection and a bayonet-type connection. For purposes of the present invention, however, it may be stated that the under portion of connector 114 is provided with cavities 117 and 118 as indicated in FIGURE 13 and in FIGURES 15 and 16 respectively. The inner end of bow lever 104 is disposed within cavity 117 and the inner end of bow lever 105 is disposed within cavity 118. These bow levers are connected to connector 114 by rivets 115 and 116 respectively, which act as pivot pins. Springs 119 and 121 are connected between connector 114 on the one hand and bow levers 104 and 105 on the other hand. These springs act in the same manner as springs 63 and 64 seen in FIGURE 10, in that they urge the outer ends of the bow levers toward the wiper blade carrier 103 to which they are connected.

The load member in the case of this embodiment of the invention comprises a clip generally indicated at 122. The construction of this member is perhaps best seen in FIGURES 13 and 16 and comprises an inverted generally channel-shaped member with a top wall 123 and downwardly extending side walls 124 and 125. U-shaped tabs 126 and 127 are formed at the bottom of the side walls and engage opposite edges of carrier 103 so as to slidably retain the carrier. Clip 122 is nested within the inner end of bow lever 105 and pin 116 passes through side walls 124 and 125.

The underside of connector 114 is also provided with a central cavity 128, and head 106 of the wiper blade is disposed within this cavity. A pair of downwardly extending legs 129 and 131 on connector 114 are disposed on opposite sides of this cavity at the central portion thereof, as seen in FIGURES 11 and 15. The bottoms of these legs engage the top surface of carrier 103.

It will therefore be seen that downward pressure on connector 114 (in the direction of the arrow 132 of FIGURE 11) will be transmitted through clip 122 and legs 129 and 131 directly to the central portion of carrier 103 and from there to the central portion of blade 102. Thus, the glass-engaging pressure applied by the oscillating arm will be effective to clear the central portion of the windshield regardless of a skip-wipe condition which may occur. At the same time, the outer ends of carrier 103 will receive engaging forces by virtue of bow levers 104 and 105 which are urged counterclockwise and clockwise respectively in FIGURE 11 by springs 119 and 121.

FIGURES 17 to 23 illustrate still another embodiment of the invention which differs from that of FIGURES 1 to 10 mainly in that the wiper blade carrier is made up of three sections rather than as a single continuous piece. In this embodiment, the wiper blade is generally indicated at 201, the carrier at 202, the upper and lower bow levers at 204 and 205 respectively, the connector at 206, and the load bar at 207. The wiper blade and bow levers are constructed in the same manner as in the embodiments of FIGURES 1 to 10. Connector 206 is in the form of a link made up of two halves 208 and 209, as shown in FIGURE 21, these halves being united by rivets 211 and 212 as seen in FIGURES 20 and 22. Connector 206 may be made of a plastic material, and has an upwardly open recess 213 for receiving pin 214 of coupler 215. The ends of connector 206 are recessed as indicated at 216 and 217 in FIGURE 19 to receive the inner ends of bow levers 204 and 205 respectively, as well as pins 211 and 212. Springs 218 and 219 surround pins 211 and 212 respectively and serve to urge bow levers 204 and 205 toward carrier 202.

The carrier is constructed of three sections 221, 222 and 223. Each of these sections comprises a flat main portion having a slot 224, and upwardly extending end flanges. More particularly, section 221 has an outer end flange 225 similar to flange 46 of the embodiment of FIGURES 1 to 10, and an inner flange 226. Section 222 has an end flange 227 abutting flange 226 and a flange 228. Section 223 has an inner end flange 229 and an outer end flange 231 like flange 46.

Flanges 226 and 229 are alike, and flange 229 may be seen more clearly in FIGURE 23. This flange has an aperture 232 of rectangular cross-sectional shape. Flanges 227 and 228 are alike, flange 228 being seen in FIGURE 23 and having an upwardly open slot 233 in registry with opening 232. Flanges 228 and 229 are welded together as indicated at 234 and so are flanges 226 and 227.

Load bar 207 comprises a member of inverted channel-shaped cross-section, with an upwardly extending pair of ears 235. Pin 212 passes through these ears as seen in FIGURE 22, the ears being disposed within the inner end of bow lever 205. The opposite ends of load bar 207 are adapted to fit in the openings 232 and 233 at the junctures of the blade carrier sections. More particularly, load bar 207 has a top section 236 which terminates short of the ends of the load bar, and side walls 237 and 238 which are brought together at the ends as indicated at 239. These ends are slidably disposed within openings 232 and 233, so that downward force on load bar 207 as indicated by the arrow 241 in FIGURE 17 will result in pressure being applied to the junctures of the carrier sections and thence directly to blade 201 along the central portion thereof.

The downward force on load bar 207 will be exerted by connector 206 through the medium of pin 212 and also through a downward extension 242 which is seen in FIGURES 17, 19 and 21. This downward projection will engage the top wall 236 of load bar 207 at a point spaced from pin 212. Thus, the glass-engaging force exerted by the oscillating arm will be transmitted directly to the central portion of the wiper blade, bow levers 204 and 205 exerting pressure on the outer ends of the blade through the urging of springs 218 and 219.

It should be noted that the sectioned carrier 202 has the advantage of affording easily engageable pressure points for its connection with load bar 207, namely, the junctures of flanges 226 and 227 and of 228 and 229. Moreover, the fact that the carrier is made of several sections increases the versatility of this wiper construction, in that these sections could be manufactured with different spring strengths, thus selectively varying the flexibility of the carrier along its length.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a windshield wiper assembly, a wiper blade, an elongated carrier for said blade, first and second bow levers overlying said carrier, a connector disposed between said bow levers, spaced pivotal connections between the opposite ends of said connector and the inner ends of said bow levers, the outer ends of said bow levers engaging the outer ends of said carrier, springs between said connector and said bow levers urging the outer ends of said bow levers against said carrier, a load member between said connector and said carrier engageable with a central portion of said carrier, means for attaching said connector to an oscillating arm so as to receive the glass-engaging force exerted by said oscillating arm, and a non-resilient pivotal connection between said connector and said load member for transmitting said glass-engaging force directly from said connector to said load member, whereby the central portion of said wiper blade will receive said glass-engaging force directly while the outer ends of the wiper blade will receive glass-engaging forces through the intermediary of said springs, said means for attaching the connector to the oscillating arm being spaced from the pivotal connection between said connector and load member in a direction toward one of said bow levers, whereby the connector is permitted to rock about said last-mentioned pivotal connection toward said load member in response to said glass-engaging force when said one bow lever follows a curved portion of the windshield.

2. The combination according to claim 1, said connector comprising a link with said pivotal connections at the ends thereof, said load member comprising a load bar having means at the ends thereof slidably connected to said wiper blade carrier and means at the central portion thereof pivotally connecting said load bar to said link, a central portion of said link having means engageable with said load bar for transmitting said glass-engaging force.

3. The combination according to claim 2, said last-mentioned means comprising a pin, and an oscillating arm coupler pivotally connected to said link by said last-mentioned pin.

4. The combination according to claim 2, said last-mentioned means comprising a projection on the underside of said link.

5. The combination according to claim 2, said springs comprising coil springs surrounding the pins between said connector and bow levers, said means slidably connecting the load bar and carrier comprising U-shaped tabs formed on the ends of the load bar.

6. The combination according to claim 2, said load bar having a generally channel-shaped cross section and being curved so as to be spaced from said carrier when the carrier is straight, except where the ends of the load bar slidably engage the carrier, said bow members being likewise curved, whereby the wiper blade and carrier may bend along their entire length to conform to curvature in the windshield being wiped.

7. The combination according to claim 1, said load member comprising a clip pivotally connected to said connector and slidably connected to the central portion of said carrier by U-shaped tabs, whereby said last-mentioned pivotal connection and U-shaped tabs comprise said means for transmitting the glass-engaging force directly from the connector to the carrier.

8. The combination according to claim 7, said connector being fabricated of two parts of plastic material secured together by rivets which also constitute the means pivotally connecting said bow levers and connector, one of said rivets being the pivot pin which connects said clip to said connector, recesses at the opposite ends of said connector for receiving the inner ends of said bow levers, and projecting means on said connector engageable with said carrier at a position spaced from said clip, whereby said last-mentioned projecting means will also serve to transmit glass-engaging forces from said oscillating arm to said carrier.

9. The combination according to claim 8, said wiper blade having a head and a mounting portion extending along its length and connected by a neck portion, said carrier having a slot receiving said neck portion, said projecting means on the connector being disposed on opposite sides of said head.

10. The combination according to claim 9, further provided with a series of notches in said head adjacent each outer end of the wiper blade, whereby flexure of said wiper blade to conform to windshield curvature will be facilitated.

11. The combination according to claim 10, said head portion extending laterally to both sides of said neck portion, said notches being formed in both sides of said head portion and the series of notches extending about one-third the length of the carrier from each end, the middle third of the carrier head being unnotched.

12. The combination according to claim 11, said notches being of V-shaped configuration with apices of the notches on opposite sides of said head being slightly spaced from each other.

13. The combination according to claim 1, said wiper blade carrier comprising a plurality of sections of spring-like steel, each of said sections having a flat slotted main portion retaining said carrier and upstanding flange portions at the ends thereof, the flange portions of adjacent carrier sections being welded to each other.

14. The combination according to claim 13, there being three carrier sections, said load bar overlying the central carrier section, and apertured portions formed in said welded flange portions, the ends of said load bar being slidably retained by said apertured portions, whereby said flange portions serve to transmit glass-engaging forces from said load bar directly to said carrier.

15. The combination according to claim 14, said load bar being of channel-shaped cross section with the central wall thereof terminating short of the ends of the load bar, the side walls being brought together at said ends and extending through said apertured portions of the carrier.

16. In a wiper blade construction for an automotive windshield wiper, a tapered edge portion for engaging the windshield, a mounting portion above said edge portion, a head above said mounting portion, a neck portion connecting said head and mounting portion, and a series of spaced notches in said head, said series extending inwardly from the opposite ends of the wiper blade, whereby bending of the wiper blade end portions to conform to a curved windshield will be facilitated.

17. The combination according to claim 16, said notches being formed in opposite sides of said head and each series extending about one-third of the carrier length from each end thereof.

18. In a wiper blade carrier construction for automotive windshield wipers, a plurality of carrier sections of spring-like steel, each carrier section comprising a flat main portion which is slotted to receive the wiper blade, the sections being aligned, and upstanding flanges at the junctures of said sections, said flanges being welded together to form the entire carrier.

19. A carrier according to claim 18, further provided with a wiper blade having a tapered edge portion, a mounting portion, a head and a neck portion connecting the head and mounting portions, said carrier slots receiving the neck portion of said wiper blade.

20. The combination according to claim 19, further provided with means for applying glass-engaging pressure at said junctures of the carrier sections, said last-mentioned means comprising a load bar overlying the central portion of said carrier and curved so as to be spaced therefrom along its main extent, the ends of said load bar being slidably connected to said carrier section junctures.

References Cited

UNITED STATES PATENTS

| 2,871,498 | 2/1959 | Oishei et al. | 15—250.42 X |
| 2,996,746 | 8/1961 | Vickerson | 15—250.42 |

FOREIGN PATENTS

| 1,033,521 | 4/1953 | France. |

CHARLES A. WILLMUTH, *Primary Examiner.*